United States Patent [19]
Chaffin

[11] 3,953,086
[45] Apr. 27, 1976

[54] GIB

[75] Inventor: Frank R. Chaffin, Thousand Oaks, Calif.

[73] Assignee: W. S. Shamban & Co., Los Angeles, Calif.

[22] Filed: July 15, 1974

[21] Appl. No.: 488,516

[52] U.S. Cl. .......................... 308/3 A; 308/DIG. 8
[51] Int. Cl.² .......................................... F16C 17/00
[58] Field of Search ................ 308/3 R, 3 A, 3 GH, 308/DIG. 8, 238

[56] References Cited
UNITED STATES PATENTS

| | | | |
|---|---|---|---|
| 2,809,418 | 10/1957 | Gallimore et al. | 308/3 A X |
| 3,711,166 | 1/1973 | Wayson | 308/3 R |

Primary Examiner—M. Henson Wood, Jr.
Assistant Examiner—Gene A. Church

[57] ABSTRACT

A tapered gib for use in machine tools is composed entirely of a plastic material such as an acetal resin containing uniformly dispersed, finely divided particles of polytetrafluoroethylene so as to provide reduced friction. The surface of the gib in contact with the associated table and positioned between the saddle and the table is formed with raised portions forming the contact surfaces. Various forms of raised surfaces may be used including nibs, ridges and the like. The gib, by virtue of the material of which it is made, fits better, may be operated without lubrication and offers the advantage that it wears relatively slowly and in preference to the metal components with which it is in sliding contact. When worn, the gib may be easily replaced and the new gib easily adjusted since it can be stressed to fit the way in the table with a minimum of deforming creep and short of taking a permanent set by virtue of the compressive forces encountered.

20 Claims, 8 Drawing Figures

U.S. Patent   April 27, 1976   3,953,086
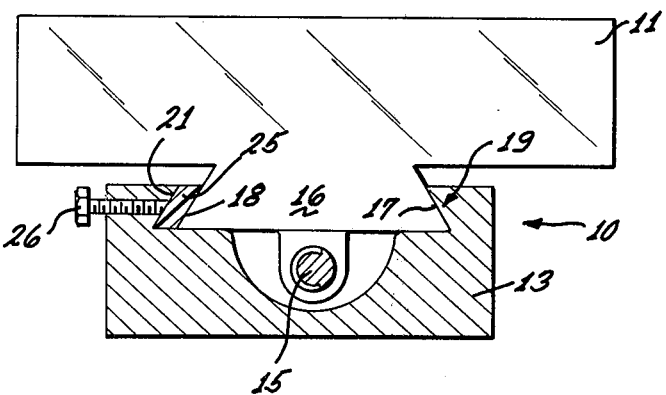
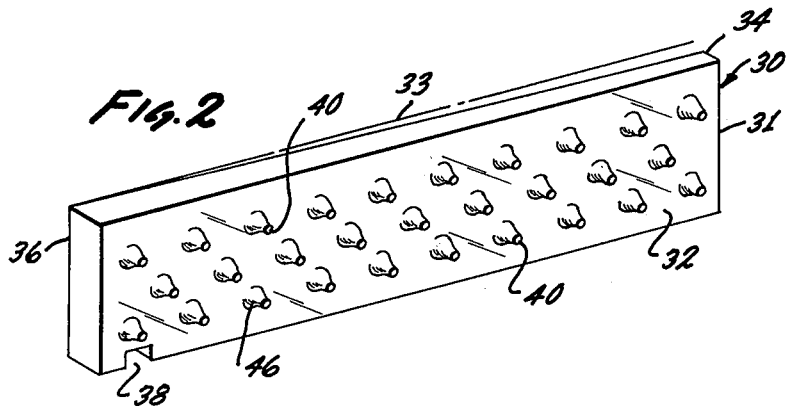
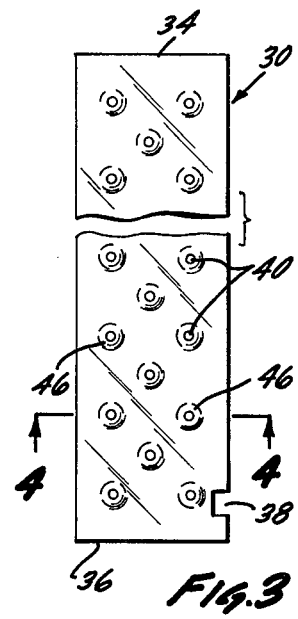
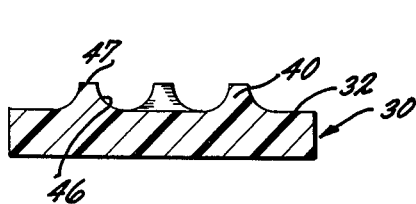
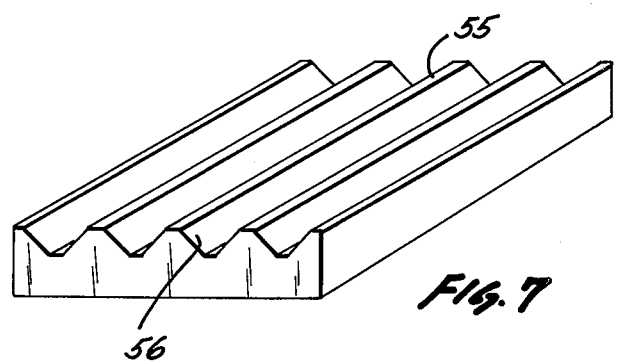
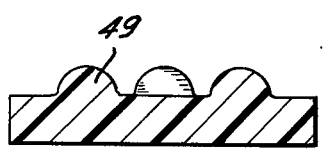
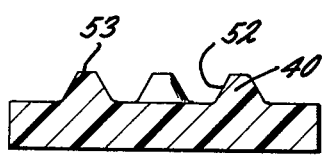
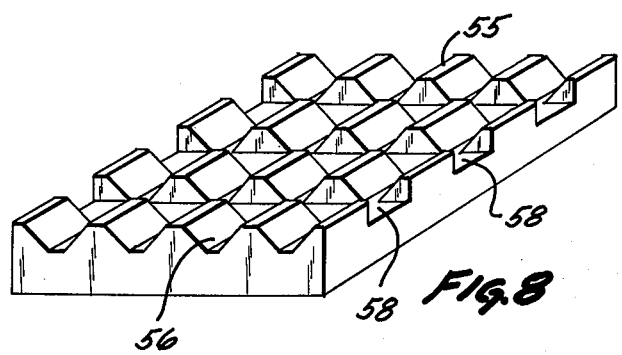

GIB

BACKGROUND OF THE INVENTION

This invention relates to a gib usable with various types of machine tools and more particularly to an improved tapered gib which is of low friction and may be run dry and which will accommodate various ways without critical match fitting procedures used with metal gibs.

Most machine tools include a table which is movable in an *x-y* direction or in three coordinates, i.e. an *x-y-z* direction. The table is normally mounted on a saddle which includes a lead screw or ball screw device to effect movement of the table in one coordinate direction. In some machine tools, the table is held in movable alignment with the saddle by a tapered gib received in a way, the gib being used to form an adjustable table tightening device for proper controlled precision movement of the table.

Normally, tapered gibs are made of cast iron and run in contact with a steel table, a lubricant being used between the relatively movable parts. Such a gib is normally fitted to the way such that there is a proper fit over the entire range of table movement.

As will be appreciated, such a procedure is time consuming and requires considerable care in order to assure that the sliding frictional relationship is essentially of the same magnitude over the entire range of table movement. In other words, high spots which could conceivably cause a binding action must be removed after their location has been ascertained. It will be apparent, therefore, that fitting a cast iron gib to a way requires considerable time and critical measuring and machining operations.

In the normal use of a machine tool including a tapered gib, the predominant portion of the machining is done in a midrange of table movement. Thus, by virtue of the sliding friction fit between the gib and the way, there is wear of both the gib and the way, which wear is most concentrated in that portion of the table in which the predominant amount of machining is done in the normal use of the equipment. As the gib and/or the table wear, the gib is moved axially in order to compensate for the wear thereby maintaining the table in proper alignment. That is, wear of the gib and/or the way creates "play" which is eliminated by moving the tapered gib axially in the way. The effect of such an adjustment is to increase the friction between the gib and the way on those portions of the table other than which most machining operations are made, for example, the ends of the table. Thus, as the table is moved from the center position to one or the other of the ends, the friction gradually increases with the result that the rate of movement is slowed, or requiring a larger motor in order to effect such movement. Where it is desirable to move the table at a rapid rate, for example, in connection with numerically controlled equipment, it is important that the frictional engagement between the tapered gib and the way be the same throughout the entire length of table movement.

It will also be apparent that replacement of the gib is as involved a procedure as the original fitting of the gib. The principal difficulty, however, is the nonuniform wear which occurs in the way of the table as a result of the normal use of the machine tool since the dominant portion of the machining operations generally take place in the central portion of the table.

The position of the gib axially in the way is adjustable and set by a locking device which secures the gib in position in the way. It will be appreciated, therefore, that nonuniform movement of the table is easily detected by an experienced machine tool operator, as is play which results from a worn gib or a combination of worn gib and worn way.

Accordingly, it becomes quite apparent that the disadvantages of the use of metal tapered gibs create serious practical problems in machine tool construction, and/or repair, which problems are easily detected by the machine tool operators. It is not uncommon for an experienced machine tool operator to characterize a particular machine tool as a "bad" machine in the context that the table is difficult to move in certain directions or inaccurate in its movement, or both. Frequently the source of the problem is the improper adjustment of the gib, or a worn gib which results in play of even a small amount which affects the position of the table and therefore the accuracy of the machining operation. Such inaccuracies due to the gib structure, alignment, or position are particularly critical in the case of numerically controlled machines. For example, the fact that a table may be worn more in the midsection than at the ends results in a different backlash condition as the table travels in the midsection. In numerically controlled equipment, this requires a complex differential in settings to accommodate the different backlash conditions. In some instances, the adjustment of the gib is off to such an extent that numerically controlled equipment cannot be used because of the inability to reach precise accurate positions as controlled by the numerically controlled equipment.

Accordingly, the provision of a gib of a tapered type which provides a uniform low friction sliding surface for control of the table is definitely advantageous, particularly if the gib is of a type which need not be fitted to the particular way as has been the case with tapered metal gibs of the prior art. For example, a gib which is of sufficient strength and wear characteristics as well as of a conformable material in the sense that it will accommodate the small variations in the way overcomes the problem of critical matching of the gibs with the ways during the course of building and/or repair of machine tools.

It is known in the prior art to utilize low friction material as a coating or a layer on the surface of the gib which is in sliding contact with the way. Such an arrangement has the disadvantage of wearing differentially, that is, wearing at the portions which are in the maximum frictional engagement with the relatively movable way. Also, such an arrangement requires special machining of the metal gib to remove sufficient metal to accommodate the added thickness of the low friction material adhered or otherwise secured to the face of the gib. While the use of such a layer or material is an improvement over an all metal gib, the fact that the material is essentially a flat sheet fixed between the metal gib and the metal way results in differential wear of the material and ultimately leads to play.

It is also advantageous to provide a gib which does not bring about wear of the way, and which does not bring about nonuniform wear of that portion of the way located in the area in which the major portion of the machining operations are accomplished.

SUMMARY OF THE PRESENT INVENTION

By the present invention, a tapered gib is provided which overcomes the problem of the prior art gibs in that it is non-metallic, less expensive, self-lubricating, and eliminates the critical adjustments normally necessary in fitting the metal tapered gibs of the prior art. More importantly, however, the tapered gib of the present invention substantially eliminates wear of the way since it is the gib rather than the way which wears, although the wear is at a relatively low rate. As the gib wears, it may be adjusted without the concomitant disproportionate wear of the way which generally occurs with metal tapered gibs. The fact that the gib wears in preference to the way is of unique advantage, in accordance with the present invention, since the way always remains true, and the use of a gib constructed in accordance with the present invention renders relatively easy the replacement of gibs which require replacement because of their wear. The advantage is that the travel characteristics of the table remain substantially the same over the entire range of table movement for essentially the entire life of the machine tool since it is the gib rather than the way which wears, and no nonuniform wearing of the way takes place.

To achieve the above-described advantages, the gib of the present invention, which is of the tapered variety, includes a solid plastic member formed principally of an acetal polymer or copolymer having incorporated therein a fluorocarbon resin such as finely divided polytetrafluoroethylene particles for the purposes of lubricity. The polytetrafluoroethylene (PTFE) particles are uniformly distributed throughout the entire mass of the tapered gib and are relatively small in size. In fact, the PTFE particles prior to being compounded with the acetal resin resemble a very fine dust. Procedures are well known in the art for providing PTFE particles of this fine quality.

The principal advantage of the tapered gib formed of the plastic material, in accordance with the present invention, is the fact that the gib may be stressed to conform to any irregularities which occur in the way, with the result that the mating surface of the gib will conform to the surface against which it slides. As will be appreciated, the composition of the plastic material is such that it behaves to some extent as if it were a metal component, but is deformable to a slight degree and therefore, does not creep or cold flow nor does it take a permanent set. Operating with a plastic material of this type, it is possible to accommodate the small variations which would normally result in critical fitting and machining operations for a nondeformable metal gib.

The gib of the present invention preferably includes a surface portion which includes raised protrusions forming the sliding surface face. For example, the raised surface may include nibs or longitudinally extending ridges which act as the actual sliding face. By providing such an arrangement, any local deformations which are necessary in order to accommodate a proper fit between the gib and the way are easily accommodated.

The plastic material is preferably one of low moisture absorption such that its dimensions do not change during use and under varying humidity conditions. Preferably, the modulus of elasticity of the compounded plastic gib material is between 200,000 and 400,000 psi, with a preferred range being between 350,000 and 380,000 psi. As will be apparent, this relatively high modulus of elasticity provides a material having considerable strength, but one which can be deformed only minutely without taking a permanent set or cold flowing to an extent which would result in improper fit between the gib and the associated way.

One of the additional practical advantages of the present invention is the fact that the tapered plastic gib may be formed by injection molding or extrusion techniques. Once properly formed and stress relieved, the gib provides a low friction surface whose adjustment within the way is not as critical as the adjustments heretofore necessary with an all metal tapered gib. The friction is substantially uniform over the entire length of table travel, while there is relatively little if any wear on the metal portions of the way or table since the gib is worn in preference to the way. While the friction of the plastic tapered gib of the present invention is low, it is sufficiently high to be able to locate the table with a static friction lock. This offers advantages in that it is not necessary to lock the table in position as is true with gibs of the roller or ball type which have very low friction. Thus, the gib of the present invention offers some frictional resistance which is greater than that of a roller or ball type gib, but comparable in frictional performance to a lubricated metal gib but having the advantages of being a dry nonexternally lubricated assembly.

These and other features and advantages of the present invention will become more apparent with a detailed description of the preferred embodiments such as those illustrated and described in connection with the acompanying drawings.

DESCRIPTION OF THE DRAWINGS

FIG. 1 is a view, in section, illustrating the general position of the gib in accordance with the present invention;

FIG. 2 is a view in perspective of a gib constructed in accordance with the present invention;

FIG. 3 is a view of one surface of the gib constructed in accordance with the present invention;

FIG. 4 is a sectional view taken along the lines 4—4 of FIG. 3;

FIG. 5 is a sectional view of a gib in accordance with the present invention showing a form of protrusions which may be used;

FIG. 6 is a sectional view of a gib in accordance with the present invention illustrating another form of protrusions which may be used;

FIG. 7 is a view in section again illustrating still another form of protrusions which may be used; and FIG. 8 is a sectional view of a gib constructed in accordance with the present invention illustrating still another form of protrusions which may be utilized.

DESCRIPTION OF THE PREFERRED EMBODIMENT

Referring to FIG. 1 which illustrates, in diagrammatic form, a work table of a machine tool, the position of the gib is illustrated for the purposes of explanation. The portion of machine tool generally designated 10 includes a table 11 supported on a saddle 13 on which is mounted a lead screw assembly generally indicated 15. By appropriate control of the lead screw, the table 11 is caused to move in a precise controlled fashion.

As illustrated, the lower portion 16 of the table includes inclined faces 17 and 18, face 17 being received within a mating face 19 formed in the saddle. Disposed between a spaced mating face 21 of the saddle and inclined face 18 is a gib element 25 secured in place by a locking assembly 26 in the form of a set screw or the like which extends through the saddle and into the gib thereby holding the gib in fixed relationship relative to the saddle. Surfaces 17 and 19, and 18 and 21 are sometimes referred to as ways and operate to guide the controlled movement of the work table 11.

The function of the gib 25 is to urge the surface 17 into accurate controlled sliding contact with surface 19 of the saddle, the gib 25 being adjustable axially along the way in which it is received to adjust the frictional sliding movement of the table with respect to the saddle.

One of the types of gibs used in machine tools is frequently referred to as a tapered gib received within a correspondingly tapered way such that axial movement of the gib within the way increases the friction but likewise operates to urge the table into close and accurately controlled sliding movement with the saddle. Thus, it becomes apparent that with a tapered gib received within a tapered way, minute adjustments of the gib axially within the way create high frictional forces and result in the gib being under substantial compressive forces. It is these compressive forces which tend to urge surface 21 away from surface 18 thereby bringing surfaces 17 and 19 into close and accurate running relationship.

In accordance with the present invention, the gib is constructed in a unique manner and of a material which offers unique properties in connection with gibs of the tapered variety and which are subjected to substantial compressive forces. Due to the substantial compressive forces, as previously pointed out, minute irregularities in the ways adversely affect the function of the gibs which must carefully be matched to fit the way in which the gib is received. It is this matching of gibs, especially tapered metal which has created some of the problems with metal tapered gibs in the prior art.

In accordance with this invention, the gib is constructed of a plastic material which is relatively low creep or cold flow but which is capable of distortion only to a limited extent and in amount insufficient to take a permanent set when under compressive forces. Effectively, the material used for the production of gibs in accordance with the present invention is capable of withstanding substantial compressive forces while at the same time deforming slightly in order to match any slight irregularities in the way surfaces, a feature which cannot be accomplished with metal gibs.

The material to be used in accordance with the present invention is a thermoplastic base material such as an acetal resin containing a PTFE lubricant which is finely divided and uniformly distributed through the acetal resin. The PTFE is present in an amount sufficient to reduce the coefficient of friction of the acetal resin, but not present in an amount which creates creep of cold flow of the compounded mixture, as will be apparent from the data hereinafter set forth. While PTFE has been included in the material and operates to reduce the coefficient of friction, lubricating oils and the like may be used with the gib of the present invention. The compounded material may be injection or extrusion molded and thereafter punched, milled, stamped, drilled, ground, or machined to final dimensions, if desired. Such a material, being basically an acetal resin has outstanding creep resistance although the addition of the PTFE additive for lubricating purposes reduces it somewhat. To assure dimensional stability of the material, the parts are heat treated after formation to take out any stresses formed during molding.

The acetal resin may be a homopolymer or a copolymer and the compounded material with the PTFE offers the advantages of low moisture absorption, i.e. between 0.15 and 0.25 percent after 24 hours and between 0.5 percent and 0.8 percent at an equilibrium condition, when tested by ASTM D570. The flexural modulus as measured by ASTM D790 is relatively high, i.e. between 350,000 and 410,000 psi, the modulus of elasticity is also high and between 200,000 and 400,000 psi and preferably between 350,000 and 380,000 psi as measured by ASTM D790, the tensile strength is preferably in the range of 6,500 to 9,000 psi as measured by ASTM 638 while the shear strength, as measured by ASTM D732 is between 6,500 and 8,000 psi. The coefficient of friction of the compound material, absent in external lubricant, and measured on steel using the inclined plane method known in the art, is between 0.04 and 0.15. In order to reduce inertia, in those cases in which parts are movable, the specific gravity of the compounded material is low, e.g. in the range of 1.42 to 1.55, as measured by ASTM D792.

Since the compounded part is under load, the compression strength or the pressure load at failure divided by the cross sectional of the part, should be between 1,800 and 4,500 psi at 1 percent deformation and between 11,000 and 14,500 psi at 10 percent deformation, when tested by ASTM D695. Also, it is preferred to have a relatively hard material, i.e. between M60 and M78 on the Rockwell M scale when tested by ASTM D875.

Effectively, such a compounded material, of the above properties, may be stressed and will creep or cold flow a small amount, but will not take a permanent compressive set and therefore is capable of recovery.

It is this combination of properties which offers unique advantages, especially since the wear of the compounded material of the present invention is excellent and the material wears in preference to the metal part with which it is in contact. Where accuracy of controlled movement is important, as for example in various types of machine tools in which precision of movement is required over the entire range of movement, the preferential wearing of the gib in preference to the way offers several advantages as above mentioned.

To this end, the compounded material which is of unique properties for the present invention is formed into the appropriately shaped part and is so proportioned to be received in a compressed deformable state in the sense that small dimensional variations are compensated for by stressing the part short of causing it to permanently deform or creep.

Referring to FIG. 2, a tapered gib 30 is illustrated, the gib being formed of the compounded material described. In the form illustrated, the gib 30 includes a body member 31 having spaced side surfaces 32 and 33. The overall configuration of the gib is that of an elongated generally wedge shaped member having one end 34 thinner in cross section than the other end 36. The tapered effect is accomplished by having surface 33 slightly inclined with respect to surface 32, as illustrated, surface 32 forming the surface which faces surface 18 of the saddle. Thus, by moving the gib 30 in small controlled increments, the table is moved with respect to the saddle to bring about the proper sliding relationship with respect to the guide way 19.

The dimension lengthwise of the gib may vary depending upon the size of the machine into which it is received, and the transverse dimension between faces 32 and 33 may likewise vary depending upon the transverse dimension of the way into which it is received.

As illustrated in FIG. 2, the gib includes a locking notch 38 for securing the gib in fixed relationship to the saddle once the proper axial position has been achieved in accordance with the desires of the machine operator.

In accordance with the present invention, one surface of the gib, that is, surface 32 includes a multiplicity of projections in the form of nibs illustrated as 40 which extend from the surface 32 and form the contact areas between the gib and the associated surface with which the gib is in sliding contact.

In the form illustrated in FIG. 2, the projections 40 are arranged in rows and alternately spaced, as illustrated in FIG. 3. In this manner, there is contact over the entire surface of the gib which is in sliding movement relative to the metal way which it contacts.

The raised projections 40 may occupy as little as ten percent and as much as 90 percent or more of the surface area of the gib, depending upon the degree of compression to which the gib is to be exposed. Since it is important in accordance with the present invention to have some conformity, without substantial permanent deformation or permanent setting of the plastic gib, the higher anticipated compressive pressures favor the use of a gib in which a higher proportion of the surface area is of a raised projection configuration.

The projections need only extend a very small amount above the surface 32, and effectively form isolated pressure points. The use of projections also permits free passage of any lubricant through the valleys between the projections thereby simplifying the lubrication of gib-way assemblies.

As illustrated in FIG. 4, the individual projection 40 may be larger at its base 46 than at its tip 47 with the side wall forming a gradual transition from the tip to the surface 32. In the particular form illustrated in FIG. 4, the tips of the projections are flat although other forms may be used, for example as shown in FIG. 5 in which a rounded tip 49 is used for each of the projections.

As illustrated in FIG. 6, the integrally formed projections 40 have straight inclined sides 52 and a flat tip portion 53 although a rounded tip portion may be used if desired.

In another form, as illustrated in FIG. 7, the projections are in the form of ridge-like crests 55 extending longitudinally along one surface corresponding to surface 32 as shown in FIG. 2. The particular form illustrated in FIG. 7 offers the advantage that it may be extruded thereby forming one surface with projections 55 and intervening valleys 56, as illustrated.

In the form illustrated in FIG. 8, the crests 55 have been interrupted as indicated at 58 so as to form isolated ridges. Again, the advantage of the structure illustrated in FIG. 8 is the fact that the part may be extruded to form the ridges and valleys 55 and 56 with the cross-valley 58 being formed after the extrusion step.

It will also be apparent to those skilled in the art that a gib of the type described may be associated with a metal tapered gib although this is a less preferable assemblage since it is necessary to fashion the metal gib of a dimension sufficiently small to receive the gib overlay. There may, however, be certain instances in which such an arrangement is desirable, for example, where the gib is considerably large and requires more strength than one can reasonably achieve with plastic materials compounded as described herein.

While the invention has been described with reference to acetal resins and polytetrafluoroethylene it will be apparent that plastic composition having the above physical properties are important in the present invention because these physical properties define the mechanical properties of the plastic material of which the gib is fabricated and one which will perform functionally as described. Important in this functional performance, achieved by the physical character of the gib and the material of which it is made, are such items as wear, conformity but not distortion or creep, cold flow or permanently setting, low moisture absorption for dimensional stability and ease of fabrication. Other materials may be added to the plastic material such as colorants and the like, as well as fillers and the like, provided they do not adversely affect the basic performance quality of the material.

Although exemplary embodiments of the invention have been shown and described, many changes, modifications, and substitutions may be made by one having ordinary skill in the art without necessarily departing from the spirit and scope of this invention.

I claim:

1. A gib for use in a machine tool comprising
   a tapered body member including at least one planar surface with respect to which the opposite surface is tapered,
   means on at least one of surfaces forming spaced surface portions projecting from said one surface and adapted to form spaced contact areas, and
   at least said surface portions being of a material including a thermoplastic polymer having dispersed uniformly therein finely divided particles of a fluorocarbon resin.

2. A gib as set forth in claim 1 wherein
   said thermoplastic resin and fluorocarbon resin combination have:
   a. a low moisture absorption in the range of 0.5 percent to 0.8 percent at equilibrium when tested by ASTM D570;
   b. a flexural modulus in the range of 350,000 to 410,000 psi as measured by ASTM D790;
   c. a modulus of elasticity in the range of 200,000 to 400,000 psi as measured by ASTM D790; and
   d. a compression strength of between 11,000 and 14,500 psi at 10 percent deformation as measured by ASTM D695.

3. A gib as set forth in claim 2 wherein said modulus of elasticity is between 350,000 and 380,000 psi.

4. A gib as set forth in claim 1 in which said gib may be stressed to conform to the opposed relatively movable surface without taking a permanent compressive set.

5. A gib as set forth in claim 1 wherein said spaced surface projections are on said planar surface.

6. A gib as set forth in claim 1 wherein said fluorocarbon resin is finely divided polytetrafluoroethylene uniformly dispersed through said thermoplastic resin and present in an amount sufficient to effect a reduction in the coefficient of friction thereof.

7. A gib as set forth in claim 6 wherein said thermoplastic resin is an acetal resin.

8. A gib for use in a machine tool comprising a body member of thermoplastic material having uniformly dispersed therein finely divided fluorocarbon particles in an amount sufficient to effect reduction of the coefficient of friction of said body member, said body member being tapered to form a wedge-like assembly, and at least one surface of said body member intended to contact a relatively moveable surface including means forming a plurality of portions projecting therefrom and defining the contact area between said body member and the relatively movable surface.

9. A gib as set forth in claim 8 wherein said projections are in the form of alternately spaced rows of nibs.

10. A gib as set forth in claim 8 wherein said projections are in the form of nibs which are larger at their base than at the tip thereof.

11. A gib as set forth in claim 8 wherein said projections are in the form of longitudinally extending crests having valleys between adjacent crests.

12. A gib as set forth in claim 8 wherein said projections form between 10 percent and 90 percent of the surface area of the gib surface in contact with the relatively movable way.

13. A gib for use in a machine tool comprising
a tapered body member of plastic material,
means on at least one surface of said body member forming projecting surface portions and defining the contact areas with an opposed relatively movable surface,
said plastic material being a thermoplastic resin having finely divided fluorocarbon resin particles substantially, uniformly dispersed therein, and
said plastic material being resistant to cold flow but capable of deforming sufficiently to conform to irregularities in the surface of the parts between which the gib is received.

14. A gib as set forth in claim 13 wherein said fluorocarbon resin is polytetrafluoroethylene and said thermoplastic resin is an acetal resin.

15. A gib as set forth in claim 14 wherein said thermoplastic resin and fluorocarbon resin combination have:

a. a low moisture absorption in the range of 0.5 percent to 0.8 percent at equilibrium when tested by ASTM D570;
b. a flexural modulus in the range of 350,000 to 410,000 psi as measured by ASTM D790;
c. a modulus of elasticity in the range of 200,000 to 400,000 psi as measured by ASTM D790; and
d. a compression strength of between 11,000 and 14,500 psi at 10 percent deformation as measured by ASTM D695.

16. A gib as set forth in claim 15 wherein said modulus of elasticity is in the range of 350,000 to 380,000 psi.

17. A gib as set forth in claim 15 wherein the surface from which said projections extend is planar.

18. A gib as set forth in claim 17 wherein said projections are in the form of rows of individual nib-like projections.

19. A gib as set forth in claim 18 wherein the nib includes a flat exposed upper contact surface.

20. A gib for use in a machine tool comprising:
means forming a tapered body member,
means on at least one surface of said body member forming spaced surface projections adapted to form spaced contact areas,
at least said surface portions being of a material including a thermoplastic resin having uniformly dispersed therein finely divided particles of fluorocarbon resin, and
said material having:
  a. A moisture absorption of between 0.15 percent and 0.25 percent after 24 hours and between 0.5 percent and 0.8 percent at equilibrium when measured by ASTM D570;
  b. a flexural modulus of between 350,000 and 410,000 psi as measured by ASTM D790;
  c. a modulus of elasticity of between 200,000 and 400,000 when measured by ASTM D790;
  d. a tensile strength in the range of 6,500 to 9,000 psi when measured by ASTM 638;
  e. a shear strength of between 6,500 and 8,000 psi when measured by ASTM D732; and
  f. a compressive strength of between 11,000 and 14,500 psi at 10 percent deformation when tested by ASTM D695.

* * * * *